United States Patent
Zhan (10) Patent No.: US 11,546,221 B2
(45) Date of Patent: Jan. 3, 2023

(54) LINK CAPACITY ADJUSTMENT METHOD AND DEVICE

(71) Applicant: ZTE Corporation, Shenzhen (CN)

(72) Inventor: Zhiguo Zhan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 19 days.

(21) Appl. No.: 17/257,639

(22) PCT Filed: Mar. 21, 2019

(86) PCT No.: PCT/CN2019/079127
§ 371 (c)(1),
(2) Date: Jan. 4, 2021

(87) PCT Pub. No.: WO2020/010875
PCT Pub. Date: Jan. 16, 2020

(65) Prior Publication Data
US 2021/0273854 A1 Sep. 2, 2021

(30) Foreign Application Priority Data
Jul. 12, 2018 (CN) .......................... 201810765154.8

(51) Int. Cl.
*G06F 13/00* (2006.01)
*H04L 41/0896* (2022.01)
(Continued)

(52) U.S. Cl.
CPC ...... *H04L 41/0896* (2013.01); *H04L 41/0893* (2013.01); *H04L 43/0817* (2013.01); *H04L 43/0864* (2013.01); *H04L 43/0882* (2013.01)

(58) Field of Classification Search
CPC ............. H04L 41/0896; H04L 41/0893; H04L 43/0817; H04L 43/0864; H04L 43/0882;
(Continued)

(56) References Cited

U.S. PATENT DOCUMENTS 10,097,480 B2 * 10/2018 Gareau .................. H04J 3/065
10,193,688 B2 * 1/2019 Gareau ............... H04L 63/0435
(Continued)

FOREIGN PATENT DOCUMENTS

CN 101141826 A 3/2008
CN 104113517 A 10/2014
(Continued)

OTHER PUBLICATIONS

International Search Report for corresponding application PCT/CN2019/079127 filed Mar. 21, 2019; dated May 23, 2019.
(Continued)

*Primary Examiner* — Kenneth R Coulter
(74) *Attorney, Agent, or Firm* — Cantor Colburn LLP (57) ABSTRACT

Provided are a link capacity adjustment method and device. The method includes: a node device obtains a latency of a Physical Layer (PHY) for link capacity adjustment of a Flex Ethernet (FlexE) group; and clock offsets of all the PHYs in the FlexE group are aligned according to the obtained latency. According to embodiments of the present disclosure, the clock offsets of all the PHYs in the FlexE group are aligned, thereby preventing data loss caused by the clock offsets of the PHYs in the FlexE group during link capacity adjustment.

20 Claims, 1 Drawing Sheet

---

A node device obtains a latency of a PHY for link capacity adjustment of a FlexE group — 101

The clock offsets of all the PHYs in the FlexE group are aligned according to the obtained latency — 102

(51) Int. Cl.
  *H04L 41/0893* (2022.01)
  *H04L 43/0817* (2022.01)
  *H04L 43/0864* (2022.01)
  *H04L 43/0882* (2022.01)

(58) Field of Classification Search
  CPC .... H04L 7/033; H04L 43/0852; H04J 3/1658; H04J 2203/0085; H04J 2203/0089
  USPC ........................................ 709/230, 238, 241
  See application file for complete search history.

(56) References Cited

U.S. PATENT DOCUMENTS

| | | | | |
|---|---|---|---|---|
| 10,673,782 | B2* | 6/2020 | Gareau | H04J 3/065 |
| 10,903,929 | B2* | 1/2021 | Zha | H04Q 11/0062 |
| 11,082,332 | B2* | 8/2021 | Mei | H04B 10/25753 |
| 2017/0171163 | A1* | 6/2017 | Gareau | H04L 63/061 |
| 2018/0375800 | A1* | 12/2018 | Gareau | H04L 43/106 |
| 2019/0280797 | A1* | 9/2019 | Zha | H04Q 11/0062 |
| 2020/0067827 | A1* | 2/2020 | Mei | H04L 45/245 |
| 2020/0252350 | A1* | 8/2020 | Gareau | H04L 43/106 |
| 2021/0111933 | A1* | 4/2021 | Xiao | H04J 3/0682 |

FOREIGN PATENT DOCUMENTS

| | | |
|---|---|---|
| CN | 106612203 A | 5/2017 |
| CN | 106918730 A | 7/2017 |
| CN | 107438029 A | 12/2017 |
| EP | 3113502 A1 | 1/2017 |
| WO | 2018041228 A1 | 3/2018 |

OTHER PUBLICATIONS

European Search Report for corresponding application EP19835048; Report dated Nov. 17, 2021.

* cited by examiner

LINK CAPACITY ADJUSTMENT METHOD AND DEVICE

CROSS REFERENCE

The present application claims priority to Chinese Patent Application No. 201810765154.8 filed on Jul. 12, 2018 with China National Intellectual Property Administration, the entirety of which is herein incorporated by reference.

TECHNICAL FIELD

The present disclosure relates to the technical field of communications, in particular to a link capacity adjustment method and device.

BACKGROUND

Flex Ethernet (FlexE) is an interface technology for a bearer network to realize service isolation bearing and network sharding. A FlexE group is a group obtained by binding one or more than one Ethernet Physical Layer (PHY) together.

When link capacity of the FlexE group is adjusted, calendar configuration is inevitable, and when the calendar configuration is performed, data transmitted by PHYs will be lost due to the wrong service flow, the wrong switching order of nodes, the improper time slot configuration of nodes, and the clock offsets of multiple PHYs in the FlexE group with link capacity adjustment.

Therefore, to achieve a lossless calendar configuration, these problems that may cause data loss need to be solved. There are corresponding solutions in related technologies for the problems of the wrong service flow, the wrong switching order of nodes and the improper time slot configuration of nodes. For the problem of the clock offsets of multiple PHYs in the FlexE group with the link capacity adjustment, the solution is to realign the clock offsets of all the PHYs in the FlexE group with the link capacity adjustment, that is, the order of arrival of data flows transmitted by all the PHYs is readjusted to meet service requirements, but there is a lack of corresponding technical means in the related technologies.

SUMMARY

To solve the above technical problem, embodiments of the present disclosure provide a link capacity adjustment method and device, which can realign clock offsets of all PHYs in a FlexE group, thereby preventing data loss caused by the clock offsets of the PHYs during link capacity adjustment.

For the purpose of the present disclosure, the embodiments of the present disclosure provide a link capacity adjustment method, which includes: a node device obtains a latency of a PHY for link capacity adjustment of a FlexE group; and clock offsets of all the PHYs in the FlexE group are aligned according to the obtained latency.

The embodiments of the present disclosure also provide a node device, which includes: an obtaining module, configured to obtain the latency of the PHY for the link capacity adjustment of the FlexE group; and a processing module, configured to align the clock offsets of all the PHYs in the FlexE group according to the obtained latency.

Compared with the related technologies, the latency of the PHY for the link capacity adjustment of the FlexE group is obtained, and the clock offsets of all the PHYs in the FlexE group are aligned according to the obtained latency, thereby preventing the data loss caused by the clock offsets of the PHYs in the FlexE group during the link capacity adjustment.

Other characteristics and advantages of the present disclosure will be elaborated in the subsequent specification, and become in part apparent from the specification or become known through the implementation of the present disclosure. The purposes and other advantages of the present disclosure may be realized and obtained through the structures specified in the specification, the claims and the accompanying drawings.

BRIEF DESCRIPTION OF THE DRAWINGS

The accompanying drawings are used for providing further understanding of the technical solution of the present disclosure, and constitute a part of the specification. The accompanying drawings are used for illustrating the technical solution of the present disclosure together with the embodiments of the present application, and not intended to form a limit to the technical solution of the present disclosure.

DETAILED DESCRIPTION OF THE EMBODIMENTS

In order to make the purpose, technical solutions and advantages of the present disclosure clearer, the embodiments of the present disclosure will be described below in combination with the drawings in detail. It is to be noted that the embodiments in the present application and the characteristics in the embodiments may be combined under the condition of no conflicts.

These steps shown in the flowchart of the accompanying drawings can be executed in a computer system like a group of computer executable instructions. Moreover, although a logical sequence is shown in the flowchart, in some cases, the shown or described steps can be performed in a sequence different from that described herein.

Before describing a link capacity adjustment method provided by the embodiments of the present disclosure, some related technologies are described.

The FlexE technology provides a general mechanism to transmit a series of services with different Media Access Control (MAC) rates. The service may be a single service with a higher MAC rate, or a set of multiple services with a relatively low MAC rate, and is not limited to a service with a single MAC rate.

A structural difference between the FlexE and the traditional Ethernet is that the FlexE has an additional cushion layer between an MAC layer and a Physical Coding Sublayer (PCS). The cushion layer functions in constructing a calendar. The calendar consists of 20*n data blocks, and the size of each data block is 66 bits and represents a time slot of 5G. n is the number of Physical Layers (PHY) bound.

The Q3 conference of the 2017 Optical Internet Forum (OIF) released the first draft of FlexE2.0, which focuses on a 200G/400G PHY that may be bound similar to a 100G PHY in the standard 1.0. In order to make the best use of the specification content of the original 100G PHY, 200G/400G PHY introduces a logical concept instance, that is, 200G PHY is decomposed into 2 instances, and 400G PHY is decomposed into 4 instances. Each instance is basically equivalent to a 100G PHY. In an overhead field of the FlexE 1.0, PHY MAP is modified to FlexE Map, and PHY Number is modified to instance Number; meanwhile, an indicator of clock synchronization is added.

Figure 1:
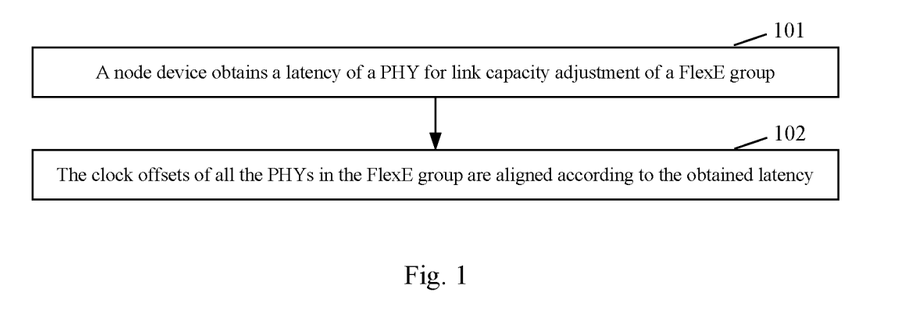
FIG. 1 is a flowchart of a link capacity adjustment method provided by an embodiment of the present disclosure.

The embodiments of the present disclosure provide a link capacity adjustment method. As shown in FIG. 1, the method includes the following steps.

At S101, a node device obtains a latency of a PHY for link capacity adjustment of a FlexE group.

Specifically, S101 is what happens when the node device is going to adjust the link capacity, but it has not really started yet. Before the link capacity adjustment, it is needed to align a clock offset of the PHY, that is, the preparation work before the link capacity adjustment is really started.

At S102, the clock offsets of all the PHYs in the FlexE group are aligned according to the obtained latency.

In the link capacity adjustment method provided by the embodiments of the present disclosure, the node device obtains the latency of the PHY for the link capacity adjustment of the FlexE group; and the clock offsets of all the PHYs in the FlexE group are aligned according to the obtained latency. It can be seen from the embodiments of the present disclosure that the latency of the PHY for the link capacity adjustment of the FlexE group is obtained, and the clock offsets of all the PHYs in the FlexE group are aligned according to the obtained latency, thereby preventing the data loss caused by the clock offsets of the PHYs in the FlexE group during the link capacity adjustment.

In an embodiment, the PHY for the link capacity adjustment of the FlexE group is an added PHY. After the clock offsets of all the PHYs in the FlexE group are aligned according to the obtained latency, the adjustment method further includes the following steps.

At S103, if the alignment is successful, the PHY for the link capacity adjustment of the FlexE group is added.

It is to be noted that if the alignment is failed, the PHY for the link capacity adjustment of the FlexE group cannot be added.

At S104, a general overhead is sent to a correspondent node device in a new overhead cycle.

In an embodiment, before the node device obtains the latency of the PHYs for the link capacity adjustment of the FlexE group, the adjustment method further includes the following step.

At S105, an overhead carrying a Calendar Request (CR) is sent to the correspondent node device, so that the correspondent node device adjusts link capacity of the FlexE group and aligns the clock offsets.

Before the general overhead is sent to the correspondent node device in the new overhead cycle, the adjustment method further includes the following step.

At S106, an overhead carrying a Calendar Acknowledge (CA) from the correspondent node device is received, so as to confirm that the correspondent node device aligned the clock offsets.

It is to be noted that if the node device receives the overhead carrying the CA from the correspondent node device, it confirms that the correspondent node device aligned the clock offsets, which means it confirms that the correspondent node device has the ability of link adjustment, so the node device sends the general overhead to the correspondent node device in the new overhead cycle, thus performing the final link adjustment.

In an embodiment, the PHY for the link capacity adjustment of the FlexE group is a deleted PHY. After the clock offsets of all the PHYs in the FlexE group are aligned according to the obtained latency, the adjustment method further includes the following steps.

At S107, if the alignment is successful, the PHY for the link capacity adjustment of the FlexE group is deleted.

At S108, a service on the PHY for the link capacity adjustment of the FlexE group is stopped, and the PHY for the link capacity adjustment of the FlexE group is deleted in the new overhead cycle.

In an embodiment, the number of PHYs for the link capacity adjustment of the FlexE group is 1, and the PHY is the added PHY. That the clock offsets of all the PHYs in the FlexE group are aligned according to the obtained latency includes the following steps.

At S102a, when the obtained latency is greater than the latency of any original PHY in the FlexE group, a read clock of the original PHY in the FlexE group is paused for $N_1$ time ticks according to requirements of a service to be processed.

$N_1$ is equal to the difference between the latency of the added PHY and the shortest one of the latencies of the original PHYs in the FlexE group.

At S102b, data flows transmitted by the original PHYs in the FlexE group are cached, an idle block is inserted in the cached data flows, and a rate is adjusted, so that the clock offsets of all the PHYs in the FlexE group are aligned.

In an embodiment, when the obtained latency is less than the latency of any original PHY in the FlexE group, the adjustment method further includes the following steps.

At S102c, the read clock of the added PHY and the read clocks of the original PHYs except the PHY with the longest latency are paused for $N_2$ time ticks according to the requirements of the service to be processed.

$N_2$ is equal to the difference between the longest one of the latencies of the original PHYs and the latency of the added PHY in the FlexE group.

At S102d, the data flows transmitted by the PHYs the read clocks of which are paused for $N_2$ time ticks are cached, the idle block is inserted in the cached data flows, and the rate is adjusted, so that the clock offsets of all the PHYs in the FlexE group are aligned.

In an embodiment, when the obtained latency is between the latencies of any two original PHYs in the FlexE group, the adjustment method further includes the following steps.

At S102e, the read clock of the added PHY and the read clocks of the original PHYs except the PHY with the longest latency are paused for $N_3$ time ticks according to the requirements of the service to be processed.

$N_3$ is equal to the difference between the longest one and the shortest one of the latencies of the original PHYs in the FlexE group.

At S102f, the data flows transmitted by the PHYs the read clocks of which are paused for $N_3$ time ticks are cached, the idle block is inserted in the cached data flows, and the rate is adjusted, so that the clock offsets of all the PHYs in the FlexE group are aligned.

In an embodiment, that the idle block is inserted in the cached data flows includes that: the idle block is inserted between a start data block and an end data block of the cached data flows; or, the idle block is inserted between the end data block of the cached data flows and the next start data block.

It is to be noted that the cached data flows in S102b refer to the data flows transmitted by all the PHYs in the FlexE group, the cached data flows in S102d refer to the data flows transmitted by the PHYs the read clock of which is paused for $N_2$ time ticks (that is, the data flows transmitted by the added PHY and the original PHYs except the PHY with the longest latency), the cached data flows in S102f refer to the data flows transmitted by the PHYs the read clock of which is paused for $N_3$ time ticks (that is, the data flows transmitted by the added PHY and the original PHYs except the PHY with the longest latency).

In an embodiment, the number of PHYs for the link capacity adjustment of the FlexE group is 1, and the PHY is the deleted PHY. That the clock offsets of all the PHYs in the FlexE group are aligned according to the obtained latency includes the following steps.

At S102f, when the obtained latency is greater than the latency of any original PHY in the FlexE group, the read clocks of the PHYs except the PHY with the second longest latency in the FlexE group and the deleted PHY are paused for $N_4$ time ticks.

$N_4$ is equal to the difference between the latency of the PHY with the second longest latency and the latency of the PHY with the shortest latency in the FlexE group.

At S102g, the data flows transmitted by the PHYs the read clocks of which are paused for $N_4$ time ticks are cached, the idle block is inserted in the cached data flows, and the rate is adjusted, so that the clock offsets of the PHYs except the deleted PHY in the FlexE group are aligned.

In an embodiment, when the obtained latency is less than the latency of any original PHY in the FlexE group, the adjustment method further includes the following steps.

At S102h, the read clocks of the PHYs except the PHY with the longest latency and the deleted PHY in the FlexE group are paused for $N_5$ time ticks.

$N_5$ is equal to the difference between the latency of the PHY with the longest latency and the latency of the PHY with the second shortest latency in the FlexE group.

At S102i, the data flows transmitted by the PHYs the read clocks of which are paused for $N_5$ time ticks are cached, the idle block is inserted in the cached data flows, and the rate is adjusted, so that the clock offsets of the PHYs except the deleted PHY in the FlexE group are aligned.

In an embodiment, when the obtained latency is between the latencies of any two original PHYs in the FlexE group, the adjustment method further includes the following steps.

At S102j, the read clocks of the PHYs except the PHY with the longest latency and the deleted PHY in the FlexE group are cached for $N_6$ time ticks. $N_6$ is equal to the difference between the latency of the PHY with the longest latency and the latency of the PHY with the shortest latency in the FlexE group.

At S102k, the data flows transmitted by these PHYs the read clocks of which are paused for $N_6$ time ticks are cached, the idle block is inserted in the cached data flows, and the rate is adjusted, so that the clock offsets of the PHYs except the deleted PHY in the FlexE group are aligned.

In an embodiment, the number of PHYs for the link capacity adjustment of the FlexE group is N. N is an integer greater than 1. That the clock offsets of all the PHYs in the FlexE group are aligned according to the obtained latency includes the following step.

At S1021, the clock offsets of all the PHYs in the FlexE group are aligned according to the i-th latency of the N latencies corresponding to the N PHYs for the link capacity adjustment. i=1, 2, . . . , N.

Specifically, assuming that the PHY for the link capacity adjustment of the FlexE group is the added PHY, and assuming that the original FlexE group includes the PHY 1, the PHY 2 and the PHY 3, and the obtained latencies are the latency of the PHY 4 and the latency of the PHY 5, then that the clock offsets of all the PHYs in the FlexE group are aligned according to the obtained latency may be that: the clock offsets of all the PHYs in the FlexE group consisting of the PHY 1, the PHY 2 and the PHY 3 are aligned according to the obtained latency, and then the clock offsets of all the PHYs in the FlexE group consisting of the PHY 1, the PHY 2, the PHY 3 and the PHY 4 are aligned according to the obtained latency of the PHY 5. Assuming that the PHY for the link capacity adjustment of the FlexE group is the deleted PHY, and assuming that the original FlexE group includes the PHY 1, the PHY 2, the PHY 3, the PHY 4 and the PHY 5, and the obtained latencies are the latency of the PHY 4 and the latency of the PHY 5, then that the clock offsets of all the PHYs in the FlexE group are aligned according to the obtained latency may be that: the clock offsets of all the PHYs in the FlexE group consisting of the PHY 1, the PHY 2, the PHY 3 and the PHY 5 are aligned according to the obtained latency of the PHY 4, and then the clock offsets of all the PHYs in the FlexE group consisting of the PHY 1, the PHY 2 and the PHY 3 are aligned according to the obtained latency of the PHY 5.

The embodiments of the present disclosure also provide a computer-readable storage medium, which stores a computer-executable instruction. The computer-executable instruction is used for performing any above link capacity adjustment method.

The present disclosure also provides a link capacity adjustment method using a PHY. When the PHY is added, the method includes the following steps.

At S1, when a calendar is configured, both a local node and a correspondent node start a new PHY.

At S2, the local node sends an overhead frame at the new PHY as a CR while sending an overhead at the original PHY. The overhead frame of the new PHY is defined as: start flag 0X4B with FlexE overhead, O code 0X5, OMF multiple frame indicator, the FlexE Group Number is the corresponding FlexE Group number, the CR field is 1, and other fields are set to 0.

At S3, after a correspondent node receives the overhead frame (CR) of the new PHY, the clock offsets of multiple PHYs need to be aligned due to the multiple PHYs involved.

If the new PHY has the longest latency, the read clocks of all the original PHYs are paused for $N_1$ time ticks (N has a maximum threshold beyond which an alarm is given to indicate that alignment cannot be achieved), $N_1$ being equal to the difference between the latency of the added PHY and the shortest one of the latencies of the original PHYs, the data flows transmitted by these PHYs the read clocks of which are paused for $N_1$ time ticks are cached, the idle block is inserted in the cached data flows, and the rate is adjusted, so that the clock offsets of all the PHYs are aligned.

If the new PHY has the shortest latency, the read clock of the added PHY and the read clocks of the original PHYs except the PHY with the longest latency are paused for $N_2$ time ticks, $N_2$ being equal to the difference between the longest one of the latencies of the original PHYs and the latency of the added PHY (N has a maximum threshold beyond which an alarm is given to indicate that alignment cannot be achieved), the data flows transmitted by these PHYs the read clocks of which are paused for $N_2$ time ticks are cached, the idle block is inserted in the cached data flows, and the rate is adjusted, so that the clock offsets of all the PHYs are aligned.

If the latency of the new PHY is between the latencies of the original PHYs, the read clock of the new PHY is paused for $N_3$ time ticks, at the same time, the read clocks of the original PHYs except the PHY with the longest latency are paused for $N_3$ time ticks, $N_3$ being equal to the difference between the longest one and the shortest one of the latencies of the original PHYs, the data flows transmitted by these PHYs the read clocks of which are paused for $N_3$ time ticks are cached, the idle block is inserted in the cached data flows, and the rate is adjusted, so that the clock offsets of all the PHYs are aligned.

There are two solutions of inserting the idle block.

In the first solution, the idle block is inserted between S block and T block.

It is to be noted that the advantage of the solution is a short latency, and the disadvantage is that both a sending node and a receiving node are required to have the ability of processing such data.

In the second solution, the idle block is inserted between the T block and the S block. It is to be noted that the advantage of the solution is that the data format is a standard format, which can be supported by both the sending node and the receiving node, and the disadvantage is that the latency is slightly greater than that of the first solution.

It is to be noted that it is considered normal that the new PHY carries the overhead frame of the FlexE, and no error is reported.

At S4, if the correspondent node may be switched, while the overhead frame is sent at the original PHY, the overhead frame is sent at the new PHY as a CA. The overhead frame of the new PHY is defined as: start flag 0X4B with FlexE overhead, O code 0X5, OMF multiple frame indicator, the FlexE Group Number is the corresponding FlexE Group number, the CA field is 1, and other fields are set to 0.

At S5, after a local node receives the overhead frame (CA) of the new PHY, alignment is performed due to multiple PHYs involved. The processing procedure is consistent with that of the correspondent node, so it will not be repeated here.

At S6, at the beginning of the new overhead cycle, the local node and the correspondent node are officially switched, service data is transmitted at the new PHY, and the overhead frames of all the PHYs are filled in accordance with existing standards.

The present disclosure also provides a link capacity adjustment method. When the PHY is deleted, the method includes the following steps.

At S1, the local node identifies the PHY to be deleted, and calculates how the alignment of the correspondent node will be performed if the PHY is deleted.

If the deleted PHY has the longest latency, the read clocks of the PHYs in the FlexE group are paused for $N_4$ time ticks, $N_4$ being equal to the difference between the latency of the PHY with the second longest latency and the latency of the PHY with the shortest latency in the FlexE group, the data flows transmitted by the PHYs the read clocks of which are paused for $N_4$ time ticks are cached, the idle block is inserted in the cached data flows, and the rate is adjusted, so that the clock offsets of the PHYs except the deleted PHY in the FlexE group are aligned.

If the deleted PHY has the shortest latency, the read clocks of the PHYs in the FlexE group are paused for $N_5$ time ticks, $N_5$ being equal to the difference between the latency of the PHY with the longest latency and the latency of the PHY with the second shortest latency in the FlexE group, the data flows transmitted by the PHYs the read clocks of which are paused for $N_5$ time ticks are cached, the idle block is inserted in the cached data flows, and the rate is adjusted, so that the clock offsets of the PHYs except the deleted PHY in the FlexE group are aligned.

If the latency of the deleted PHY is between the latencies of all the PHYs, the read clocks of the PHYs in the FlexE group are paused for $N_6$ time ticks, $N_6$ being equal to the difference between the latency of the PHY with the longest latency and the latency of the PHY with the shortest latency in the FlexE group, the data flows transmitted by these PHYs the read clocks of which are paused for $N_6$ time ticks are cached, the idle block is inserted in the cached data flows, and the rate is adjusted, so that the clock offsets of the PHYs except the deleted PHY in the FlexE group are aligned.

At S2, the correspondent node identifies the PHY to be deleted, and calculates how the alignment of the local node will be performed if the PHY is deleted. The specific process is consistent with the processing of alignment of the correspondent node calculated by the local node, so it will not be repeated here.

At S3, if the local node and the correspondent node can be switched, then the PHY is officially deleted; or else, the operation of deleting the PHY is terminated.

At S4, if the PHY is going to be deleted officially, the service on the PHY to be deleted is stopped, switching is officially performed at the beginning of the new overhead cycle, a new caching scheme is adopted to process the alignment of each PHY, the idle block is inserted in a normal code stream, the rate is adjusted, and the overhead frames of all the PHYs are filled in accordance with existing standards.

Several specific embodiments are provided below to illustrate the link capacity adjustment method provided by the present disclosure.

Embodiment One

It is assumed that 100G PHYs a, b and c are bound to form a FlexE group, the group number of which is 1, in this case, a 100G PHY d is intended to be added.

At S1, both the local node and the correspondent node start the new PHY d.

At S2, the local node sends the overhead frame at the PHY d as the CR while sending the overhead frame at the PHYs a, b and c. The overhead frame of the PHY d is defined as: start flag 0X4B with FlexE overhead, O code 0X5, OMF multiple frame indicator, the FlexE Group Number is the corresponding FlexE Group number, the CR field is 1, and other fields are set to 0.

At S3, after the correspondent node receives the overhead frame (CR) of the PHY d, alignment is performed due to multiple PHYs involved. It is known from calculation that the PHY d has the longest latency. All the read clocks of the PHYs a, b and c are paused for $N_1$ time ticks (N has a maximum threshold beyond which an alarm is given to indicate that alignment cannot be achieved), $N_1$ being equal to the difference between the latency of the added PHY d and the shortest one of the latencies of the original PHYs, data of the PHYs a, b and c is cached, the idle block is inserted in the normal code stream, and the rate is adjusted, so that the alignment of all the PHYs is realized eventually. There are two solutions of inserting the idle block.

In the first solution, the idle block is inserted between the S block and T the block.

In the second solution, the idle block is inserted between the T block and the S block.

At S4, if the correspondent node can be switched, the correspondent node sends the overhead frame at the PHY d as the CA while sending the overhead frame at the PHYs a, b and c. The overhead frame of the PHY d is defined as: start flag 0X4B with FlexE overhead, O code 0X5, OMF multiple frame indicator, the FlexE Group Number is the corresponding FlexE Group number, the CA field is 1, and other fields are set to 0.

At S5, after the local node receives the overhead frame (CA) of the PHY d, due to multiple PHYs involved, the processing procedure of alignment is consistent with that of the correspondent node, so it will not be repeated here.

At S6, at the beginning of the new overhead cycle, the local node and the correspondent node are officially switched, the service data is transmitted at the PHY d, and the overhead frames of the PHYs a, b and c are filled in accordance with existing standards.

Embodiment Two

It is assumed that the 100G PHYs a, b and c are bound to form a FlexE group, the group number of which is 1, in this case, the 100G PHY d is intended to be added.

At S1, both the local node and the correspondent node start the new PHY d.

At S2, the local node sends the overhead frame at the PHY d as the CR while sending the overhead frame at the PHYs a, b and c. The overhead frame of the PHY d is defined as: start flag 0X4B with FlexE overhead, O code 0X5, OMF multiple frame indicator, the FlexE Group Number is the corresponding FlexE Group number, the CR field is 1, and other fields are set to 0.

At S3, after the correspondent node receives the overhead frame (CR) of the PHY d, deskew is performed due to multiple PHYs involved. It is known from calculation that the PHY d has the shortest latency. The read clock of the PHY d is paused for N time ticks (N has a maximum threshold beyond which an alarm is given to indicate that alignment cannot be achieved), at the same time, except the PHY with the longest latency in the original PHYs, the read clocks of other PHYs are paused for $N_2$ time ticks. $N_2$ is equal to the difference between the longest one of the latencies of the original PHYs and the latency of the added PHY. The data flows transmitted by these PHYs the read clocks of which are paused for $N_2$ time ticks are cached, the idle block is inserted in the cached data flows, and the rate is adjusted, so that the clock offsets of all the PHYs are aligned.

At S4, if the correspondent node can be switched, the correspondent node sends the overhead frame at the PHY d as the CA while sending the overhead frame at the PHYs a, b and c. The overhead frame of the PHY d is defined as: start flag 0X4B with FlexE overhead, O code 0X5, OMF multiple frame indicator, the FlexE Group Number is the corresponding FlexE Group number, the CA field is 1, and other fields are set to 0.

At S5, after the local node receives the overhead frame (CA) of the PHY d, alignment is performed due to multiple PHYs involved. It is known from calculation that the PHY d has the shortest latency. The read clock of the PHY d is paused for N time ticks (N has a maximum threshold beyond which an alarm is given to indicate that alignment cannot be achieved), at the same time, except the PHY with the longest latency in the original PHYs, the read clocks of other PHYs are paused for $N_2$ time ticks. $N_2$ is equal to the difference between the longest one of the latencies of the original PHYs and the latency of the added PHY. The data flows transmitted by these PHYs the read clocks of which are paused for $N_2$ time ticks are cached, the idle block is inserted in the cached data flows, and the rate is adjusted, so that the clock offsets of all the PHYs are aligned.

At S6, at the beginning of the new overhead cycle, the local node and the correspondent node are officially switched, the service data is transmitted at the PHY d, and the overhead frames of the PHYs a, b and c are filled in accordance with existing standards.

Embodiment Three

It is assumed that the 100G PHYs a, b and c are bound to form a FlexE group, the group number of which is 1, in this case, the 100G PHY d is intended to be added.

At S1, both the local node and the correspondent node start the new PHY d.

At S2, the local node sends the overhead frame at the PHY d as the CR while sending the overhead frame at the PHYs a, b and c. The overhead frame of the PHY d is defined as: start flag 0X4B with FlexE overhead, O code 0X5, OMF multiple frame indicator, the FlexE Group Number is the corresponding FlexE Group number, the CR field is 1, and other fields are set to 0.

At S3, after the correspondent node receives the overhead frame (CR) of the PHY d, alignment is performed due to multiple PHYs involved. It is known from calculation that the latency of the PHY d is among the latencies of the PHYs a, b and c, then cache of the PHY d is provided, and the read clock of the PHY d is paused for $N_3$ time ticks; at the same time, except the PHY with the longest latency of the original PHYs, the read clocks of other PHYs are paused for $N_3$ time ticks. $N_3$ is equal to the difference between the longest one and the shortest one of the latencies of the original PHYs. The data flows transmitted by these PHYs the read clocks of which are paused for $N_3$ time ticks are cached, the idle block is inserted in the cached data flows, and the rate is adjusted, so that the clock offsets of all the PHYs are aligned.

At S4, if the correspondent node can be switched, the correspondent node sends the overhead frame at the PHY d as the CA while sending the overhead frame at the PHYs a, b and c. The overhead frame of the PHY d is defined as: start flag 0X4B with FlexE overhead, O code 0X5, OMF multiple frame indicator, the FlexE Group Number is the corresponding FlexE Group number, the CR field is 1, and other fields are set to 0.

At S5, after the local node receives the overhead frame (CA) of the PHY d, alignment is performed due to multiple PHYs involved. It is known from calculation that the latency of the PHY d is among the latencies of the PHYs a, b and c, then cache of the PHY d is provided, and the read clock of the PHY d is paused for N time ticks; at the same time, except the PHY with the longest latency of the original PHYs, the read clocks of other PHYs are paused for $N_3$ time ticks. $N_3$ is equal to the difference between the longest one and the shortest one of the latencies of the original PHYs. The data flows transmitted by these PHYs the read clocks of which are paused for N time ticks are cached, the idle block is inserted in the cached data flows, and the rate is adjusted, so that the clock offsets of all the PHYs are aligned.

At S6, at the beginning of the new overhead cycle, the local node and the correspondent node are officially switched, the service data is transmitted at the PHY d, and the overhead frames of the PHYs a, b, c and d are filled in accordance with existing standards.

Embodiment Four

It is assumed that the 100G PHYs a, b, c and d are bound to form a FlexE group, the group number of which is 1, in this case, the 100G PHY d is intended to be deleted.

At S1, a central controller notifies the local node and the correspondent node about the intention to delete the PHY d.

At S2, after knowing that the PHY d is intended to be deleted, the local node calculates how the alignment of the correspondent node will be performed if the PHY d is deleted. It is known from calculation that the PHY d has the shortest latency, the new caching scheme will complete the alignment of all the PHYs (not including the deleted PHY) after the arrival of the data of the PHY with the longest latency. The time tick for which the read clock is paused is equal to the PHY with the longest latency minus the PHY with the shortest latency.

At S3, after knowing that the PHY d is intended to be deleted, the correspondent node calculates how the alignment of the local node will be performed if the PHY d is deleted. It is known from calculation that the PHY d has the shortest latency, the new caching scheme will complete the alignment of all the PHYs (not including the deleted PHY) after the arrival of the data of the PHY with the longest latency. The time tick for which the read clock is paused is equal to the PHY with the longest latency minus the PHY with the shortest latency.

At S4, if the local node and the correspondent node can be switched, the central controller is notified.

At S5, after receiving a reply about the local node and the correspondent node can be switched, the central controller notifies the local node and the correspondent node to officially start to delete the PHY; or else, it will not send a notification of deleting the PHY to the local node and the correspondent node.

At S6, after receiving the notification of deleting the PHY, the local node and the correspondent node stop the service on the PHY d, and start to be switched at the beginning of the new overhead cycle, the new caching scheme is adopted to process the alignment of the PHYs a, b and c, the idle block is inserted in the normal code stream, the rate is adjusted, and the overhead frames of the PHYs a, b and c are filled in accordance with the existing standards.

Figure 2:
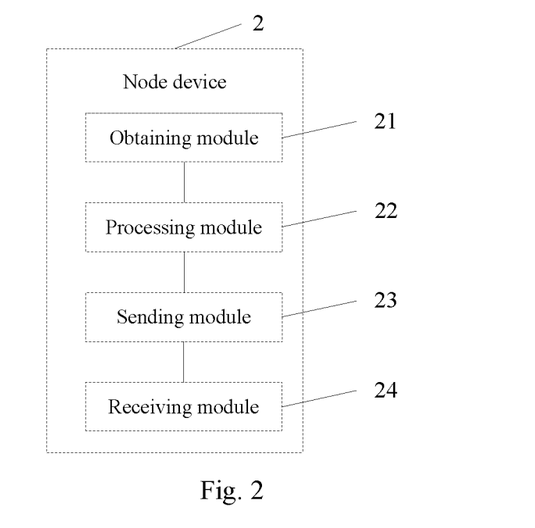
FIG. 2 is a structure diagram of a node device provided by an embodiment of the present disclosure.

The embodiments of the present disclosure also provide a node device. As shown in FIG. 22, the node device 2 includes an obtaining module 21 and a processing module 22.

The obtaining module 21 is configured to obtain the latency of the PHY for the link capacity adjustment of the FlexE group.

The processing module 22 is configured to align the clock offsets of all the PHYs in the FlexE group according to the obtained latency.

In an embodiment, the PHY for the link capacity adjustment of the FlexE group is the added PHY. The processing module 22 is further configured to, if the alignment is successful, add the PHY for the link capacity adjustment of the FlexE group.

The processing module 22 is further configured to send the general overhead to the correspondent node device in the new overhead cycle.

In an embodiment, the node device further includes a sending module 23 and a receiving module 24.

The sending module 23 is configured to send the overhead carrying the CR to the correspondent node device, so that the correspondent node device adjusts the link capacity of the FlexE group and aligns the clock offsets.

The receiving module 24 is configured to receive the overhead carrying the CA from the correspondent node device, so as to confirm that the correspondent node device aligned the clock offsets.

In an embodiment, the PHY for the link capacity adjustment of the FlexE group is the deleted PHY. The processing module 22 is further configured to, if the alignment is successful, delete the PHY for the link capacity adjustment of the FlexE group.

The processing module 22 is further configured to stop the service on the PHY for the link capacity adjustment of the FlexE group, and delete the PHY for the link capacity adjustment of the FlexE group in the new overhead cycle.

In an embodiment, the number of PHYs for the link capacity adjustment of the FlexE group is 1, and the PHY is the added PHY. The processing module 22 is specifically configured to:

when the obtained latency is greater than the latency of any original PHY in the FlexE group, pause the read clock of the original PHY in the FlexE group for $N_1$ time ticks according to the requirements of the service to be processed, $N_1$ being equal to the difference between the latency of the added PHY and the shortest one of the latencies of the original PHYs in the FlexE group;

cache the data flows transmitted by the original PHYs in the FlexE group, insert the idle block in the cached data flows, and adjust the rate, so that the clock offsets of all the PHYs in the FlexE group are aligned.

In an embodiment, when the obtained latency is less than the latency of any original PHY in the FlexE group, the processing module 22 is specifically configured to:

pause the read clock of the added PHY and the read clocks of the original PHYs except the PHY with the longest latency for $N_2$ time ticks according to the requirements of the service to be processed, $N_2$ being equal to the difference between the longest one of the latencies of the original PHYs and the latency of the added PHY in the FlexE group;

cache the data flows transmitted by the PHYs the read clocks of which are paused for $N_2$ time ticks, insert the idle block in the cached data flows, and adjust the rate, so that the clock offsets of all the PHYs in the FlexE group are aligned.

In an embodiment, when the obtained latency is between the latencies of any two original PHYs in the FlexE group, the processing module 22 is specifically configured to:

pause the read clock of the added PHY and the read clocks of the original PHYs except the PHY with the longest latency for $N_3$ time ticks according to the requirements of the service to be processed, $N_3$ being equal to the difference between the longest one and the shortest one of the latencies of the original PHYs in the FlexE group;

cache the data flows transmitted by the PHYs the read clocks of which are paused for $N_3$ time ticks, insert the idle block in the cached data flows, and adjust the rate, so that the clock offsets of all the PHYs in the FlexE group are aligned.

In an embodiment, the processing module 22 is specifically configured to:

insert the idle block between the start data block and the end data block of the cached data flows; or, insert the idle block between the end data block of the cached data flows and the next start data block.

In an embodiment, the number of PHYs for the link capacity adjustment of the FlexE group is 1, and the PHY is the deleted PHY, the processing module 22 is configured to:

when the obtained latency is greater than the latency of any original PHY in the FlexE group, pause the read clocks of the PHYs except the PHY with the second longest latency in the FlexE group and the deleted PHY for $N_4$ time ticks, $N_4$ being equal to the difference between the latency of the PHY with the second longest latency and the latency of the PHY with the shortest latency in the FlexE group;

cache the data flows transmitted by the PHYs the read clocks of which are paused for $N_4$ time ticks, insert the idle block in the cached data flows, and adjust the rate, so that the clock offsets of the PHYs except the deleted PHY in the FlexE group are aligned.

In an embodiment, when the obtained latency is less than the latency of any original PHY in the FlexE group, the processing module 22 is further specifically configured to:

pause the read clocks of the PHYs except the PHY with the longest latency and the deleted PHY in the FlexE group for $N_5$ time ticks, $N_5$ being equal to the difference between the latency of the PHY with the longest latency and the latency of the PHY with the second shortest latency in the FlexE group;

cache the data flows transmitted by the PHYs the read clocks of which are paused for $N_5$ time ticks, insert the idle block in the cached data flows, and adjust the rate, so that the clock offsets of the PHYs except the deleted PHY in the FlexE group are aligned.

In an embodiment, when the obtained latency is between the latencies of any two original PHY in the FlexE group, the processing module 22 is further specifically configured to:

pause the read clocks of the PHYs except the PHY with the longest latency and the deleted PHY in the FlexE group for $N_6$ time ticks, $N_6$ being equal to the difference between the latency of the PHY with the longest latency and the latency of the PHY with the shortest latency in the FlexE group;

cache the data flows transmitted by these PHYs the read clocks of which are paused for $N_6$ time ticks, insert the idle block in the cached data flows, and adjust the rate, so that the clock offsets of the PHYs except the deleted PHY in the FlexE group are aligned.

In an embodiment, the number of PHYs for the link capacity adjustment of the FlexE group is N, N being an integer greater than 1, the processing module 22 is specifically configured to:

align the clock offsets of all the PHYs in the FlexE group according to the i-th latency of the N latencies corresponding to the N PHYs for the link capacity adjustment. i=1, 2, . . . , N.

The node device provided by the embodiments of the present disclosure obtains the latency of the PHY for the link capacity adjustment of the FlexE group, and aligns the clock offsets of all the PHYs in the FlexE group according to the obtained latency. It can be seen from the embodiments of the present disclosure that the latency of the PHY for the link capacity adjustment of the FlexE group is obtained, and the clock offsets of all the PHYs in the FlexE group are aligned according to the obtained latency, thereby preventing the data loss caused by the clock offsets of the PHYs in the FlexE group during the link capacity adjustment.

In practical applications, all of the obtaining module 21, the processing module 22, the sending module 23 and the receiving module 24 may be implemented by a Central Processing Unit (CPU), a Micro Processor Unit (MPU), a Digital Signal Processor (DSP), or a Field Programmable Gate Array (FPGA) in the node device.

The embodiments of the present disclosure also provide a link capacity adjustment device, which includes a memory and a processor. The memory stores the following instructions that can be executed by the processor:

obtaining the latency of the PHY for the link capacity adjustment of the FlexE group; and aligning the clock offsets of all the PHYs in the FlexE group according to the obtained latency.

In an embodiment, the PHY for the link capacity adjustment of the FlexE group is the added PHY. The memory also stores the following instructions that can be executed by the processor:

if the alignment is successful, adding the PHY for the link capacity adjustment of the FlexE group; and sending the general overhead to the correspondent node device in the new overhead cycle.

In an embodiment, the memory also stores the following instructions that can be executed by the processor:

sending the overhead carrying the CR to the correspondent node device, so that the correspondent node device adjusts the link capacity of the FlexE group and aligns the clock offsets; and receiving the overhead carrying the CA from the correspondent node device, so as to confirm that the correspondent node device aligned the clock offsets.

In an embodiment, the PHY for the link capacity adjustment of the FlexE group is the deleted PHY. The memory also stores the following instructions that can be executed by the processor:

if the alignment is successful, deleting the PHY for the link capacity adjustment of the FlexE group; and stopping the service on the PHY for the link capacity adjustment of the FlexE group, and deleting the PHY for the link capacity adjustment of the FlexE group in the new overhead cycle.

In an embodiment, the number of PHYs for the link capacity adjustment of the FlexE group is 1, and the PHY is the added PHY. The memory also stores the following instructions that can be executed by the processor:

when the obtained latency is greater than the latency of any original PHY in the FlexE group, pausing the read clock of the original PHY in the FlexE group for $N_1$ time ticks according to the requirements of the service to be processed, $N_1$ being equal to the difference between the latency of the added PHY and the shortest one of the latencies of the original PHYs in the FlexE group;

caching the data flows transmitted by the original PHYs in the FlexE group, inserting the idle block in the cached data flows, and adjusting the rate, so that the clock offsets of all the PHYs in the FlexE group are aligned.

In an embodiment, when the obtained latency is less than the latency of any original PHY in the FlexE group, the memory also stores the following instructions that can be executed by the processor:

pausing the read clock of the added PHY and the read clocks of the original PHYs except the PHY with the longest latency for $N_2$ time ticks according to the requirements of the service to be processed, $N_2$ being equal to the difference between the longest one of the latencies of the original PHYs and the latency of the added PHY in the FlexE group;

caching the data flows transmitted by the PHYs the read clocks of which are paused for $N_2$ time ticks, inserting the idle block in the cached data flows, and adjusting the rate, so that the clock offsets of all the PHYs in the FlexE group are aligned.

In an embodiment, when the obtained latency is between the latencies of any two original PHYs in the FlexE group, the memory also stores the following instructions that can be executed by the processor:

pausing the read clock of the added PHY and the read clocks of the original PHYs except the PHY with the longest latency for $N_3$ time ticks according to the requirements of the service to be processed, $N_3$ being equal to the difference between the longest one and the shortest one of the latencies of the original PHYs in the FlexE group;

caching the data flows transmitted by the PHYs the read clocks of which are paused for $N_3$ time ticks, and adjusting the rate, so that the clock offsets of all the PHYs in the FlexE group are aligned.

In an embodiment, the memory also stores the following instructions that can be executed by the processor:

inserting the idle block between the start data block and the end data block of the cached data flows;

or, inserting the idle block between the end data block of the cached data flows and the next start data block.

In an embodiment, the number of PHYs for the link capacity adjustment of the FlexE group is 1, and the PHY is the deleted PHY. The memory also stores the following instructions that can be executed by the processor:

when the obtained latency is greater than the latency of any original PHY in the FlexE group, pausing the read clocks of the PHYs except the PHY with the second longest latency in the FlexE group and the deleted PHY for $N_4$ time ticks, $N_4$ being equal to the difference between the latency of the PHY with the second longest latency and the latency of the PHY with the shortest latency in the FlexE group;

caching the data flows transmitted by the PHYs the read clocks of which are paused for $N_4$ time ticks, inserting the idle block in the cached data flows, and adjusting the rate, so that the clock offsets of the PHYs except the deleted PHY in the FlexE group are aligned.

In an embodiment, when the obtained latency is less than the latency of any original PHY in the FlexE group, the memory also stores the following instructions that can be executed by the processor:

pausing the read clocks of the PHYs except the PHY with the longest latency and the deleted PHY in the FlexE group for $N_5$ time ticks, $N_5$ being equal to the difference between the latency of the PHY with the longest latency and the latency of the PHY with the shortest latency in the FlexE group;

caching the data flows transmitted by the PHYs the read clocks of which are paused for $N_5$ time ticks, inserting the idle block in the cached data flows, and adjusting the rate, so that the clock offsets of the PHYs except the deleted PHY in the FlexE group are aligned.

In an embodiment, when the obtained latency is between the latencies of any two original PHYs in the FlexE group, the memory also stores the following instructions that can be executed by the processor:

pause the read clocks of the PHYs except the PHY with the longest latency and the deleted PHY in the FlexE group for $N_6$ time ticks, $N_6$ being equal to the difference between the latency of the PHY with the longest latency and the latency of the PHY with the shortest latency in the FlexE group;

cache the data flows transmitted by these PHYs the read clocks of which are paused for $N_6$ time ticks, insert the idle block in the cached data flows, and adjust the rate, so that the clock offsets of the PHYs except the deleted PHY in the FlexE group are aligned.

In an embodiment, the number of PHYs for the link capacity adjustment of the FlexE group is N, N being an integer greater than 1. The memory also stores the following instructions that can be executed by the processor:

aligning the clock offsets of all the PHYs in the FlexE group according to the i-th latency of the N latencies corresponding to the N PHYs for the link capacity adjustment. i=1, 2, . . . , N.

Although the implementation modes disclosed in the present disclosure are as above, the contents are the implementation modes only adopted for facilitating understanding the present disclosure, but not intended to limit the present disclosure. Any skilled in the art of the present disclosure may make any modification and change on implementation forms and details without departing from the spirit and scope disclosed by the present disclosure, but the protection scope of the present disclosure is still subject to the scope limited by the claims attached.

INDUSTRIAL APPLICABILITY

The present disclosure is applied to the technical field of communications to prevent the data loss caused by the clock offsets of the PHYs in the FlexE group during the link capacity adjustment.

What is claimed is:

1. A link capacity adjustment method, comprising:
   obtaining, by a node device, a latency of a Physical Layer (PHY) for link capacity adjustment of a Flex Ethernet (FlexE) group, wherein the PHY for the link capacity adjustment of the FlexE group is an added PHY or a deleted PHY; and
   aligning clock offsets of all PHYs in the FlexE group according to the obtained latency.

2. The link capacity adjustment method as claimed in claim 1, wherein the PHY for the link capacity adjustment of the FlexE group is an added PHY; after aligning the clock offsets of all the PHYs in the FlexE group according to the obtained latency, the method further comprises:
   if the alignment is successful, adding the PHY for the link capacity adjustment of the FlexE group; and
   sending a general overhead to a correspondent node device in a new overhead cycle.

3. The link capacity adjustment method as claimed in claim 2, wherein before obtaining, by the node device, a latency of the PHYs for the link capacity adjustment of the FlexE group, the method further comprises:
   sending an overhead carrying a Calendar Request (CR) to the correspondent node device, so that the correspondent node device adjusts link capacity of the FlexE group and aligns the clock offsets;
   before sending the general overhead to the correspondent node device in the new overhead cycle, the method further comprises:
   receiving an second overhead carrying a Calendar Acknowledge (CA) from the correspondent node device, so as to confirm that the correspondent node device aligned the clock offsets.

4. The link capacity adjustment method as claimed in claim 1, wherein the PHY for the link capacity adjustment of the FlexE group is a deleted PHY; after aligning the clock offsets of all the PHYs in the FlexE group according to the obtained latency, the method further comprises:
   if the alignment is successful, deleting the PHY for the link capacity adjustment of the FlexE group; and
   stopping a service on the PHY for the link capacity adjustment of the FlexE group, and deleting the PHY for the link capacity adjustment of the FlexE group in a new overhead cycle.

5. The link capacity adjustment method as claimed in claim 1, wherein the number of the PHYs for the link capacity adjustment of the FlexE group is 1, and the PHY is an added PHY; aligning the clock offsets of all the PHYs in the FlexE group according to the obtained latency comprises:
   when the obtained latency is greater than a latency of any original PHY in the FlexE group, pausing a read clock of the original PHY in the FlexE group for $N_1$ time ticks according to requirements of a service to be processed, wherein $N_1$ is equal to the difference between the latency of the added PHY and the shortest one of the latencies of original PHYs in the FlexE group;

caching data flows transmitted by the original PHYs in the FlexE group, inserting an idle block in the cached data flows, and adjusting a rate, so that the clock offsets of all the PHYs in the FlexE group are aligned.

6. The link capacity adjustment method as claimed in claim 5, wherein when the obtained latency is less than the latency of any original PHY in the FlexE group, the method further comprises:

pausing the read clock of the added PHY and the read clocks of the original PHYs except the PHY with the longest latency for $N_2$ time ticks according to the requirements of the service to be processed, wherein $N_2$ is equal to the difference between the longest one of the latencies of the original PHYs and the latency of the added PHY in the FlexE group;

caching the data flows transmitted by the PHYs the read clocks of which are paused for $N_2$ time ticks, inserting the idle block in the cached data flows, and adjusting the rate, so that the clock offsets of all the PHYs in the FlexE group are aligned.

7. The link capacity adjustment method as claimed in claim 5, wherein when the obtained latency is between the latencies of any two original PHYs in the FlexE group, the method further comprises:

pausing the read clock of the added PHY and read clocks of the original PHYs except the PHY with the longest latency for $N_3$ time ticks according to the requirements of the service to be processed, wherein $N_3$ is equal to the difference between the longest one and the shortest one of the latencies of the original PHYs in the FlexE group;

caching the data flows transmitted by the PHYs the read clocks of which are paused for $N_3$ time ticks, inserting the idle block in the cached data flows, and adjusting the rate, so that the clock offsets of all the PHYs in the FlexE group are aligned.

8. The link capacity adjustment method as claimed in claim 5, wherein inserting the idle block in the cached data flows comprises:

inserting the idle block between a start data block and an end data block of the cached data flows;

or, inserting the idle block between the end data block of the cached data flows and the next start data block.

9. The link capacity adjustment method as claimed in claim 1, wherein the number of the PHYs for the link capacity adjustment of the FlexE group is 4, and the PHY is the deleted PHY; aligning the clock offsets of all the PHYs in the FlexE group according to the obtained latency comprises:

when the obtained latency is greater than the latency of any original PHY in the FlexE group, pausing read clocks of the PHYs except the PHY with the second longest latency in the FlexE group and the deleted PHY for $N_4$ time ticks, wherein $N_4$ is equal to the difference between the latency of the PHY with the second longest latency and the latency of the PHY with the shortest latency in the FlexE group;

caching data flows transmitted by the PHYs the read clocks of which are paused for $N_4$ time ticks, inserting the idle block in the cached data flows, and adjusting the rate, so that the clock offsets of the PHYs except the deleted PHY in the FlexE group are aligned.

10. The link capacity adjustment method as claimed in claim 9, wherein when the obtained latency is less than the latency of any original PHY in the FlexE group, the method further comprises:

pausing the read clocks of the PHYs except the PHY with the longest latency and the deleted PHY in the FlexE group for $N_5$ time ticks, wherein $N_5$ is equal to the difference between the latency of the PHY with the longest latency and the latency of the PHY with the second shortest latency in the FlexE group;

caching the data flows transmitted by the PHYs the read clocks of which are paused for $N_5$ time ticks, inserting the idle block in the cached data flows to adjust the rate, so that the clock offsets of the PHYs except the deleted PHY in the FlexE group are aligned.

11. The link capacity adjustment method as claimed in claim 9, wherein when the obtained latency is between the latencies of any two original PHY in the FlexE group, the method further comprises:

pausing the read clocks of the PHYs except the PHY with the longest latency and the deleted PHY in the FlexE group for $N_6$ time ticks, wherein $N_6$ is equal to the difference between the latency of the PHY with the longest latency and the latency of the PHY with the shortest latency in the FlexE group;

caching the data flows transmitted by these PHYs the read clocks of which are paused for $N_6$ time ticks, inserting the idle block in the cached data flows, and adjusting the rate, so that the clock offsets of the PHYs except the deleted PHY in the FlexE group are aligned.

12. The link capacity adjustment method as claimed in claim 1, wherein the number of the PHYs for the link capacity adjustment of the FlexE group is N, wherein N is an integer greater than 1; aligning the clock offsets of all the PHYs in the FlexE group according to the obtained latency comprises:

aligning the clock offsets of all the PHYs in the FlexE group according to the i-th latency of the N latencies corresponding to the N PHYs for the link capacity adjustment, wherein i=1, 2, . . . , N.

13. A node device, comprising:

an obtaining module, configured to obtain a latency of a Physical Layer (PHY) for link capacity adjustment of a Flex Ethernet (FlexE) group, wherein the PHY for the link capacity adjustment of the FlexE group is an added PHY or a deleted PHY; and a processing module, configured to align clock offsets of all PHYs in the FlexE group according to the obtained latency.

14. The node device as claimed in claim 13, wherein the PHY for the link capacity adjustment of the FlexE group is an added PHY; the processing module is further configured to, if the alignment is successful, add the PHY for the link capacity adjustment of the FlexE group; and the processing module is further configured to send a general overhead to a correspondent node device in a new overhead cycle.

15. The node device as claimed in claim 14, further comprising:

a sending module, configured to send an overhead carrying a Calendar Request (CR) to the correspondent node device, so that the correspondent node device adjusts link capacity of the FlexE group and aligns the clock offsets; and a receiving module, configured to receive an second overhead carrying a Calendar Acknowledge (CA) from the correspondent node device, so as to confirm that the correspondent node device aligned the clock offsets.

16. The node device as claimed in claim 13, wherein the PHY for the link capacity adjustment of the FlexE group is a deleted PHY; the processing module is further configured to, if the alignment is successful, delete the PHY for the link capacity adjustment of the FlexE group; and the processing module is further configured to stop a service on the PHY for the link capacity adjustment of the FlexE group, and delete the PHY for the link capacity adjustment of the FlexE group in a new overhead cycle.

17. The node device as claimed in claim 13, wherein the number of the PHYs for the link capacity adjustment of the FlexE group is 1, and the PHY is an added PHY; the processing module is configured to:

when the obtained latency is greater than the latency of any original PHY in the FlexE group, pause a read clock of the original PHY in the FlexE group for N1 time ticks according to requirements of the service to be processed, wherein N1 is equal to the difference between the latency of the added PHY and the shortest one of the latencies of original PHYs in the FlexE group;

cache data flows transmitted by the original PHYs in the FlexE group, insert an idle block in the cached data flows, and adjust a rate, so that the clock offsets of all the PHYs in the FlexE group are aligned.

18. The node device as claimed in claim 17, wherein when the obtained latency is less than the latency of any original PHY in the FlexE group, the processing module is configured to:

pause the read clock of the added PHY and read clocks of the original PHYs except the PHY with the longest latency for $N_2$ time ticks according to the requirements of the service to be processed, wherein $N_2$ is equal to the difference between the longest one of the latencies of the original PHYs and the latency of the added PHY in the FlexE group;

cache the data flows transmitted by the PHYs the read clocks of which are paused for $N_2$ time ticks, insert the idle block in the cached data flows, and adjust the rate, so that the clock offsets of all the PHYs in the FlexE group are aligned.

19. The node device as claimed in claim 17, wherein when the obtained latency is between the latencies of any two original PHYs in the FlexE group, the processing module is configured to:

pause the read clock of the added PHY and read clocks of the original PHYs except the PHY with the longest latency for $N_3$ time ticks according to the requirements of the service to be processed, wherein $N_3$ is equal to the difference between the longest one and the shortest one of the latencies of the original PHYs in the FlexE group;

cache the data flows transmitted by the PHYs the read clocks of which are paused for $N_3$ time ticks, insert the idle block in the cached data flows, and adjust the rate, so that the clock offsets of all the PHYs in the FlexE group are aligned.

20. The node device as claimed in claim 17, wherein the processing module is configured to:

insert the idle block between a start data block and an end data block of the cached data flows;

or, insert the idle block between the end data block of the cached data flows and the next start data block.

* * * * *